May 9, 1933.  J. A. OLIVIER  1,907,563
VEHICLE BODY DOOR CONSTRUCTION
Filed June 18, 1931
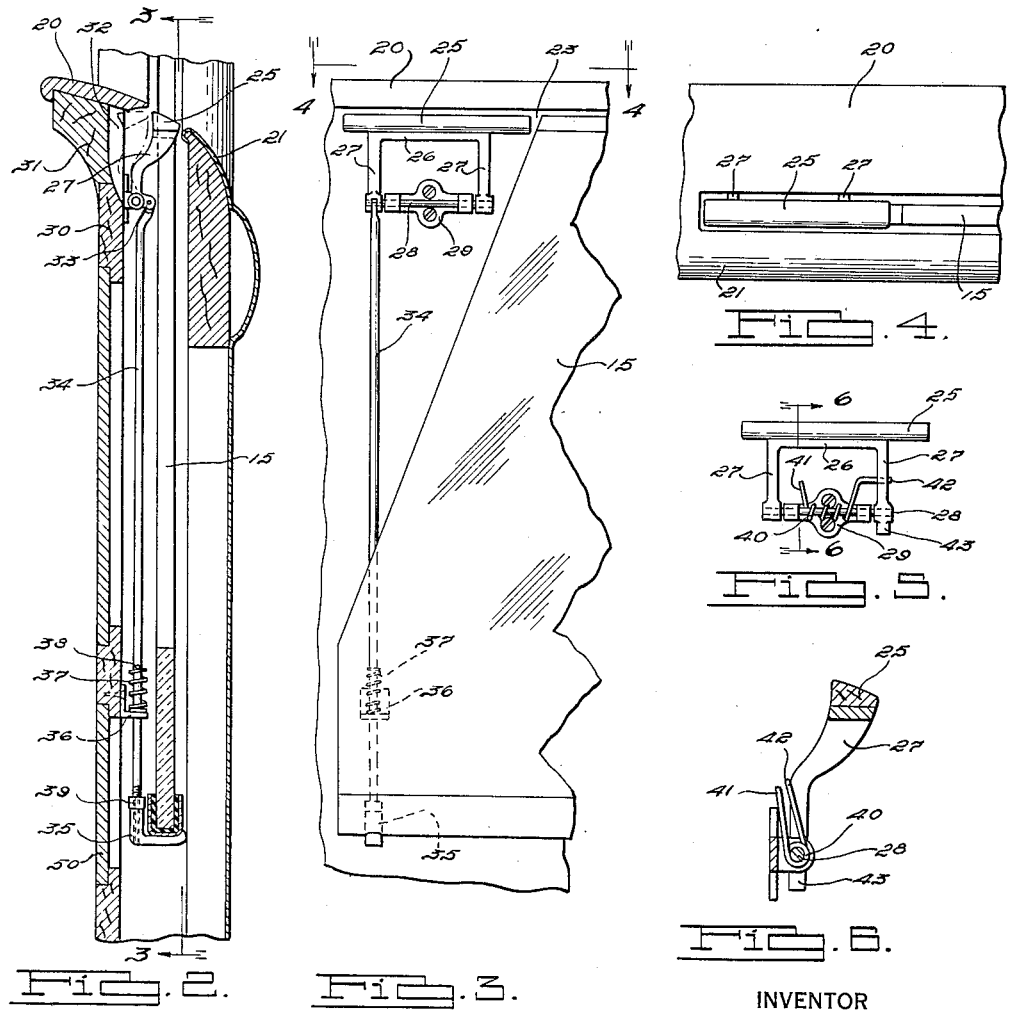
INVENTOR
Jules A. Olivier.
BY
Harness, Dickey, Pierce & Hann
ATTORNEYS.

Patented May 9, 1933

1,907,563

UNITED STATES PATENT OFFICE

JULES A. OLIVIER, OF DETROIT, MICHIGAN, ASSIGNOR TO DIETRICH, INCORPORATED, A CORPORATION OF MICHIGAN

VEHICLE BODY DOOR CONSTRUCTION

Application filed June 18, 1931. Serial No. 545,162.

My invention relates to vehicle body doors for closed vehicle bodies which contain window openings in their upper portions and vertically slidable and irregular shaped windows mounted in the door.

The principal object of the invention is to provide an automatically operating filler or cover piece for closing that portion of the slot in the door along the lower edge of the window opening which is not filled by the upper edge of the window glass when the window glass is in lowered position.

In conventional doors having rectangular windows slidable therein, the slot like opening in the door along the lower edge of the window opening is usually filled throughout its length by the upper edge of the window glass when in lowered position. However, when an irregular shaped window glass is used such as a glass having an inclined front edge and which is shorter across the top than across the bottom, the forward end of the slot in the lower edge of the window opening is left unfilled when the window glass is in its lowered position and presents a well into which miscellaneous articles may find their way to interfere with the operation of the window, and also presents an unsightly appearance.

My invention provides automatically operated means for closing this unfilled portion of the window slot and consists of the combination, construction and arrangement of parts described and claimed in the following specification and shown in the accompanying drawing in which Figure 1 is a fragmentary side elevation of an automobile body having a door therein embodying my invention.

Figure 2 is an enlarged fragmentary sectional view taken on the line 2—2 of Figure 1.

Figure 3 is an enlarged sectional view taken on line 3—3 of Figure 2.

Figure 4 is a fragmentary plan view taken at the line 4—4 of Figure 3.

Figure 5 is a side elevational view of a modified form of the filler or cover device embodied in my invention, and Figure 6 is a sectional vew taken on line 6—6 of Figure 5.

The numeral 10 designates generally the vehicle body which is provided with a slanting windshield 11 and a front door 12. In the illustration shown, the body is of the convertible type wherein the top portion may be folded back to provide an open car. The door 12 has a sliding window glass 15 mounted therein to slide vertically within a pocket or well provided in the door to cover or to close the opening above the top of the door and between the door and the roof and the windshield. Owing to the rearwardly slanting windshield the window glass 15 is provided with a rearwardly inclined front edge as indicated in Figure 3 and as indicated by the dotted lines in Figure 1. This window glass, when in its lowered position in the door 12 has its top edge substantially flush with the window sill portions 20 and 21 provided along the top edge of the door. Owing to the inclined front edge of the window glass 15, the top edge of the glass is considerably shorter than the bottom edge so that when the glass is in its lowered position an open slot will appear at 23 between the front upper corner of the window glass and the front end of the slot in the door 12. This slot is unsightly in appearance and it is in position to receive miscellaneous foreign articles which may interfere with the operation of the window glass.

I have provided means that are automatically operated by the movement of the window glass to open and close this slot 23. Such means comprise a filler piece 25 of a length adapted to fill the slot and of a width substantially the same or slightly wider than the edge of the window glass and finished to conform to the appearance of the door at the point. The filler strip 25 is mounted upon a bracket 26 having downwardly and inwardly curved leg portions 27 which are supported upon a pin 28 rotatably mounted in a journal bracket 29 which is secured by screws or other suitable means to the inner panel member 30 of the door. The inner top transverse framing member 31 which extends across the top of the door has a recess 32 therein which will permit the filler strip and its bracket to pivot inwardly underneath the edge of the top molding or sill member 20 which is provided along the upper inner edge of the door.

In the preferred construction as shown in Figures 2 and 3 the rearward arm 27 of the bracket 26 is provided with a crank member 33 to which is pivotally attached the end of an operating arm 34 which extends downwardly to a point adjacent the lower position of the window glass 15, and is there provided with an adjustable hook member 35 which extends into the path of the window glass 15 and is adapted to contact with the lower edge of the window glass when the same is lowered in the door. Positioned above the hook member 35 and the lower end of the rod 34 is an angular bracket 36 having its outwardly extending arm provided with an opening through which the rod 34 extends. A coil spring 37 is mounted upon the rod 34 with its lower end bearing against the upper surface of the extending portion of the bracket 36 and with its upper end abutting against a cross pin 38 in the rod 34. The hook member 35 is provided with a shank portion having an internally threaded bore adapted to receive the threaded end of the rod 34. A lock nut 39 is mounted upon the threaded end of the rod 34 above the hook shank 35 and is adapted to lock the hook member 36 relative to the rod 34 when tightened, or to be released to permit the hook member 35 to be turned on the rod 34 for purposes of adjustment.

In operation, the hook member 35 is so positioned upon the lower end of rod 34 as to contact with the lower edge of the window glass 15 just before it reaches its lower position in the door, thus the last travel of the window glass toward its lower position depresses the hook member 35, draws the rod 34 downwardly and causes the bracket 26 to rock outwardly on the pivot pin 28 to bring the filler strip 25 into the open slot between the forward upper corner of the window glass and the forward upper corner of the door. Conversely, when the window glass 15 is moved upwardly relative to the door, the compression spring 37 will act against the cross pin 38 in the rod 34 to force the rod upwardly and thereby rock the bracket 26 and the filler strip 25 inwardly into the recess 32 in the top framing member 31 and beneath the outer edge of the sill or molding member 20. As this action occurs immediately the window is started in its upward movement the filler strip 25 will be in the clear in sufficient time to avoid contact with the inclined forward edge of the window glass.

It is to be understood that this window glass is operated in the door by any of the conventional window regulator mechanisms as will be readily understood by those familiar in the art.

A removable panel 50 may be provided on the interior of the door and will give access to the space in which the lower end of the rod 34, the hook 35 and bracket 36 are mounted so that these members may be readily accessible for adjustment. Such panels are usually provided in doors having sliding windows therein in order to facilitate assembly of the window glass and the usual window regulating mechanism therewith.

In Figures 5 and 6 I have shown a modified form of my invention wherein the operating rod 34 and the hook member 35 and the spring 37 are dispensed with. In this modification, the filler strip 25 and bracket 26 and its supporting arms 27 as well as the pivot pin 28 and the journaled bracket 29 are the same as in the construction shown in Figures 2 and 3. In place of the rod 34 and its attendant spring 37 and hook 35 I have provided a coil spring 40 positioned around the intermediate part of the pivot pin 28 and having one end 41 extended and lying against the frame members of the door and having the other end extended at 42 and lying in contact with one of the supporting arms 27 of the bracket 26. In this form the filler strip is forced back into its recess beneath the sill member 20 by the forward inclined edge of the window glass 15 as the same moves toward its raised position and is operated outwardly to fill the slot between the forward upper corner of the window glass 15 and the forward upper corner of the door by the spring 40 when the window glass is moved downwardly in the door and ceases to contact with the filler strip 25. This is accomplished by the tension of the spring 40 with its end 41 bearing against the fixed frame of the door and its end 42 bearing against the movable bracket member 26. The outward movement of the filler strip 25 in this modification may be limited by contact with the inner edge of the outer window sill portion 21 or it may be limited by providing an extension 43 on the end of one of the arms 27 of the bracket 26. The extension 43 being extended beneath the pivot pin 28 and positioned to contact with the inner framing members of the door beneath the journal bracket 29 and limit the outward movement of the bracket 26 and the filler strip 25.

Thus I have provided an automatically operated means for filling the open part of the window slot in the door when the window is in its lowered position and one which is mounted entirely within the door framing and concealed except for its outer finished surface and one which moves entirely within the confines of the door frame, is not exposed to contact with outside objects or with the users of the car.

It is of simple and cheap construction and adds materially to the finished appearance of the car door.

Formal changes may be made in the specific embodiment of the invention described with-

I claim as my invention:

1. A vehicle door provided with a slot in the bottom of the window opening thereof through which a window glass slidably extends, said glass being of such width at its bottom as to extend across said slot and of less width at its top to extend across only a substantial portion of said slot when in lowered position leaving a gap, and an element pivoted to said door for substantially closing said gap when said window is lowered.

2. A vehicle door provided with a slot in the bottom of the window opening thereof through which a window glass slidably extends, the bottom of said glass being of a width to extend across said slot and reducing toward the top to extend across only a substantial portion of said slot when in lowered position, and an element pivoted to said door for closing the remaining portion of said slot, left open by the top edge of the glass when in lowered position.

3. A vehicle door provided with a slot in the window sill thereof through which a window glass slidably extends, the bottom of said glass being of a width to extend across said slot and reducing toward the top to extend across only a substantial portion of said slot when in lowered position, means for closing the remaining portion of said slot left open by the top edge of the glass when in lowered position, and means engageable by said glass for actuating said closing means.

4. A vehicle door provided with a slot in the window sill thereof through which a window slidably extends, means for lowering said window, means for closing at least a portion of the longitudinal length of said slot when said window is lowered, and means engageable by said window for actuating said closing means.

5. A vehicle door provided with a slot in the window sill thereof through which a window glass slidably extends, the bottom of said glass being of a width to extend across said slot and reducing toward the top to extend across only a substantial portion of said slot when in lowered position, means for closing the remaining of said slot left open by the top edge of the glass when in lowered position, means engageable by said glass for actuating said closing means, and biasing means for actuating said closing means in the opposite direction.

6. A vehicle door provided with a slot in the window sill thereof through which a window glass slidably extends, the bottom of the glass being of a width to extend across said slot and reducing toward the top to extend across only a substantial portion of said slot when in lowered position, a pivotal member for closing the remaining portion of the slot left open by the top edge of the glass when in lowered position, and means engageable by the window when being lowered for actuating said member into slot closing position.

7. A vehicle door provided with a slot in the window sill thereof through which a window glass slidably extends, the bottom of the glass being of a width to extend across said slot and reducing toward the top to extend across only a substantial part of said slot when in lowered position, a pivotal member for closing the remaining portion of the slot left open by the top edge of the glass when in lowered position, an arm on said member, a rod connected to said arm, and an element on said rod engageable by said glass substantially at the end of its downward travel for actuating said member into slot closing position.

8. A vehicle door provided with a slot in the window sill thereof through which a window glass slidably extends, the bottom of the glass being of a width to extend across said slot and reducing toward the top to extend across only a substantial portion of said slot when in lowered position, a pivotal member for closing the remaining portion of the slot left open by the top edge of the glass when in lowered position, an arm on said member, a rod connected to said arm, an element on said rod engageable by said glass substantially at the end of its downward travel for actuating said member into slot closing position, and a spring for biasing said rod upwardly to move said member from slot closing position when said rod is released upon the initial upward movement of the glass.

9. A vehicle door provided with a slot in the window sill thereof through which a window slidably extends, means for closing at least a portion of the longitudinal length of said slot when the window is in lowered position, means engageable by said window at substantially the end of its travel for actuating said closing means, and biasing means for actuating said closing means in the opposite direction.

JULES A. OLIVIER.